(12) United States Patent
Kimura et al.

(10) Patent No.: US 9,598,755 B2
(45) Date of Patent: *Mar. 21, 2017

(54) HIGH STRENGTH GALVANIZED STEEL SHEET HAVING EXCELLENT DEEP DRAWABILITY AND STRETCH FLANGEABILITY AND METHOD FOR MANUFACTURING THE SAME

(75) Inventors: Hideyuki Kimura, Fukuyama (JP); Kaneharu Okuda, Chiba (JP); Reiko Sugihara, Chiba (JP)

(73) Assignee: JFE Steel Corporation, Tokyo (JP)

( * ) Notice: Subject to any disclaimer, the term of this patent is extended or adjusted under 35 U.S.C. 154(b) by 890 days.

This patent is subject to a terminal disclaimer.

(21) Appl. No.: 13/825,236

(22) PCT Filed: Sep. 15, 2011

(86) PCT No.: PCT/JP2011/071756
§ 371 (c)(1),
(2), (4) Date: Jul. 29, 2013

(87) PCT Pub. No.: WO2012/043420
PCT Pub. Date: Apr. 5, 2012

(65) Prior Publication Data
US 2013/0292010 A1 Nov. 7, 2013

(30) Foreign Application Priority Data

Sep. 29, 2010 (JP) .................................. 2010-218922
Jul. 27, 2011 (JP) .................................. 2011-163818

(51) Int. Cl.
| | | |
|---|---|---|
| *C23C 2/02* | (2006.01) | |
| *C21D 8/04* | (2006.01) | |
| *C21D 9/48* | (2006.01) | |
| *C23C 2/06* | (2006.01) | |
| *C23C 2/28* | (2006.01) | |
| *C22C 38/00* | (2006.01) | |
| *B32B 15/01* | (2006.01) | |

(52) U.S. Cl.
CPC .............. *C23C 2/02* (2013.01); *B32B 15/013* (2013.01); *C21D 8/0405* (2013.01); *C21D 9/48* (2013.01); *C22C 38/001* (2013.01); *C22C 38/002* (2013.01); *C23C 2/06* (2013.01); *C23C 2/28* (2013.01); *C21D 2211/005* (2013.01); *C21D 2211/008* (2013.01)

(58) Field of Classification Search
CPC .... C23C 2/02; C23C 2/06; C23C 2/28; B32B 15/013; C21D 2211/005; C21D 2211/008; C21D 8/0405; C21D 9/48; C22C 38/001; C22C 38/002
See application file for complete search history.

(56) References Cited

U.S. PATENT DOCUMENTS

| | | | |
|---|---|---|---|
| 4,445,946 A | 5/1984 | Takahashi et al. | |
| 6,676,774 B2 * | 1/2004 | Matsuoka | ............ C21D 8/0273 148/320 |
| 9,297,052 B2 * | 3/2016 | Kimura | ..................... B21B 1/26 |
| 2007/0029015 A1 * | 2/2007 | Yoshinaga | ............. C21D 6/005 148/533 |

FOREIGN PATENT DOCUMENTS

| | | |
|---|---|---|
| JP | 57041349 A | 3/1982 |
| JP | 63-171832 A | 7/1988 |
| JP | 2002-226941 A | 8/2002 |
| JP | 2003-064444 A | 3/2003 |
| JP | 2003-193189 A | 7/2003 |
| JP | 2003-193191 A | 7/2003 |
| JP | 2003193189 A * | 7/2003 |
| JP | 2005-120467 A | 5/2005 |
| JP | 2005-264323 A | 9/2005 |
| JP | 2005-273008 A | 10/2005 |
| JP | 2006-265607 A | 10/2006 |

OTHER PUBLICATIONS

International Search Report dated Dec. 20, 2011, application No. PCT/JP2011/071756.

\* cited by examiner

*Primary Examiner* — Jessee Roe
*Assistant Examiner* — Jenny Wu
(74) *Attorney, Agent, or Firm* — RatnerPrestia

(57) ABSTRACT

A high-strength galvanized steel sheet contains C: 0.010% or more and 0.06% or less, Si: more than 0.5% and 1.5% or less, Mn: 1.0% or more and 3.0% or less, P: 0.005% or more and 0.1% or less, S: 0.01% or less, sol.Al: 0.005% or more and 0.5% or less, N: 0.01% or less, Nb: 0.010% or more and 0.090% or less, and Ti: 0.015% or more and 0.15% or less, on a mass percent basis. The Nb and C contents of the steel satisfy the relation of (Nb/93)/(C/12)<0.20. C* satisfies 0.005≤C*≤0.025. Ferrite constitutes 70% by area ratio or more of the steel sheet. Martensite constitutes 3% by area ratio or more of the steel sheet. C*=C−(12/93)Nb−(12/48){Ti−(48/14)N}, wherein C, Nb, Ti, and N denote the C, Nb, Ti, and N contents of the steel.

7 Claims, No Drawings

HIGH STRENGTH GALVANIZED STEEL SHEET HAVING EXCELLENT DEEP DRAWABILITY AND STRETCH FLANGEABILITY AND METHOD FOR MANUFACTURING THE SAME

CROSS REFERENCE TO RELATED APPLICATIONS

This application is the U.S. National Phase application of PCT International Application No. PCT/JP2011/071756, filed Sep. 15, 2011, and claims priority to Japanese Patent Application Nos. 2010-218922, filed Sep. 29, 2010, and 2011-163818, filed Jul. 27, 2011, the disclosures of both applications being incorporated herein by reference in their entireties for all purposes.

TECHNICAL FIELD

The present invention relates to a high-strength galvanized steel sheet that is useful for automotive steel sheets and other applications, has a tensile strength (TS) of 440 MPa or more, a high r-value (average r-value≥1.2), and a high λ value (λ≥800), and has excellent deep drawability and stretch flangeability, and a method for manufacturing the high-strength galvanized steel sheet.

BACKGROUND OF THE INVENTION

In recent years, from the standpoint of global environmental conservation, in order to regulate $CO_2$ emission, there is a demand for improvement of automobile mileage (weight reduction of automotive bodies). In addition, in order to protect occupants in a crash, there is also a demand for improvement in the crash safety performance of automotive bodies. In order to satisfy both the weight reduction of automotive bodies and improvement in the crash safety performance of automotive bodies, it is said to be effective to increase the strength of steel sheets without decreasing body stiffness and decrease the thickness of sheets to reduce the weight. Thus, high-strength steel sheets are actively used in automotive parts. The effect of weight reduction increases with increasing strength of a steel sheet. Thus, in the automobile industry, for example, steel sheets having TS of 440 MPa or more tend to be used as panel materials for inner sheets and outer sheets.

Many automotive parts made of steel sheets are formed by press working. Thus, automotive steel sheets must have excellent press formability. However, formability, particularly deep drawability and stretch flangeability, of high-strength steel sheets is significantly inferior compared with mild steel sheets. Thus, in order to achieve weight reduction of automobiles, there is an increasing demand for a steel sheet that has TS≥440 MPa, preferably TS≥500 MPa, more preferably TS≥590 MPa, and has excellent deep drawability and stretch flangeability. More specifically, there is a demand for a high-strength steel sheet that has a high Lankford value (hereinafter referred to as an r-value), such as average r-value≥1.2, preferably average r-value≥1.3, and a hole expansion ratio (hereinafter referred to as λ) of 80% or more. The Lankford value is a performance index of deep drawability, and the hole expansion ratio is a performance index of stretch flangeability.

As a technique for increasing strength, maintaining a high r-value, for example, Patent Literature 1 discloses a method for adding Ti or Nb for fixing solute carbon or solute nitrogen in an ultra-low carbon steel and adding a solid-solution hardening element, such as Si, Mn, or P, to the resulting interstitial atom free (IF) steel.

However, in accordance with such a technique for adding a solid-solution hardening element to an ultra-low carbon steel, the manufacture of a high-strength steel sheet having a tensile strength of 440 MPa or more requires a large amount of alloying element. For example, the addition of a large amount of Si results in the concentration of Si on a surface forms surface oxide during continuous annealing, this surface oxide deteriorating wettability. Si reacts with a minute amount of water vapor in the atmosphere to form a Si oxide on the surface. This results in poor coating wettability, uneven coating, and very low coating quality. The addition of a large amount of P deteriorates the anti-secondary working embrittlement by segregating of P in a grain boundary. The addition of a large amount of Mn results in a low r-value. Thus, there is a problem that the r-value decreases with strengthening of steels.

A method for strengthening a steel sheet other than the solid-solution hardening method described above may be a transformation strengthening. A dual phase steel sheet composed of mild ferrite and hard martensite generally has satisfactory ductility, excellent strength-ductility balance, and low yield strength. The dual phase steel sheet therefore has good press formability. However, the dual phase steel sheet has a low r-value and poor deep drawability. It is believed that solute C essential for the formation of martensite retards the formation of a {111} recrystallization texture, which is effective in increasing the r-value.

As a technique for improving the r-value of a dual phase steel sheet, for example, Patent Literature 2 discloses a method for performing box annealing at a temperature in the range of recrystallization temperature to $Ac_3$ transformation point after cold rolling, heating the sheet to a temperature in the range of 700° C. to 800° C. to form a dual phase, and then quenching and tempering the sheet. Patent Literature 3 discloses a high-strength steel sheet that contains a predetermined amount of C, contains 3% by volume or more of at least one of bainite, martensite, and austenite in total, and has an average r-value of 1.3 or more.

However, the techniques described in Patent Literatures 2 and 3 require annealing for forming a cluster or precipitate of Al and N to grow a texture and thereby increase the r-value and heat treatment for obtaining the DP microstructure. Furthermore, the annealing process is based on box annealing, which requires a retention time as long as one hour or more. Box annealing takes a longer treating time than continuous annealing and increases the number of processes. This results in very low efficiency and productivity and poor economic viability in terms of manufacturing costs and causes many problems in the manufacturing process, such as frequent adhesion between steel sheets, temper coloring, and a decrease in life of a furnace inner cover.

Patent Literature 4 discloses a technique for improving the r-value of a dual phase steel sheet by optimizing the V content in connection with the C content. In accordance with this technique, before recrystallization annealing, C in the steel is precipitated as V carbide to minimize the amount of solute C and increase the r-value. Subsequently, the steel is heated in the ferrite(α)-austenite(γ) dual phase region to dissolve the V carbide and concentrate C in γ. Subsequently, martensite is formed in a cooling process to produce the dual phase steel sheet.

However, with respect to such a method of dissolving V carbide during annealing in the α-γ region, variations in dissolution rate may cause variations of the material property. Thus, the annealing temperature and the annealing time must be precisely controlled, and leaves a problem in the manufacture stability.

Patent Literature 5 discloses a technique for achieving both a high r-value and a dual phase by controlling the Nb content and the C content so as to satisfy 0.2≤(Nb/93)/(C/12)≤0.7 at a C content in the range of 0.010% to 0.050% by mass %. Patent Literature 5 also discloses a technique of combined addition such that the Nb content and the Ti content satisfy 0.2≤{(Nb/93)+(Ti/48)}/(C/12)≤0.7. In accordance with these techniques, solute C required for the formation of martensite remains in a hot-rolled steel sheet, and the r-value after annealing is increased by the effect of grain refinement of the hot-rolled steel sheet by the addition of Nb and the effect of decreasing the amount of solute C by the precipitation of NbC.

As a technique for improving the r-value and the α-value of a dual phase steel sheet, Patent Literature 6 discloses a technique for achieving both a high r-value and a high λ by controlling the Nb content and the C content so as to satisfy 0.2≤(Nb/93)/(C/12)≤0.7 at a C content in the range of 0.010% to 0.050% by mass, and controlling the ratio of the hardness of a second phase to the hardness of a ferrite phase in the range of 1.5 to 3.0.

The technique described in Patent Literatures 5 and 6 increase the r-value by the effect of grain refinement of the hot-rolled steel sheet by the addition of Nb and the effect of decreasing the amount of solute C by the precipitation of NbC. However, Nb is not only very expensive but also significantly retards the recrystallization of austenite and consequently increases the load in hot rolling. Furthermore, NbC precipitated in the hot-rolled steel sheet increases deformation resistance in cold rolling. For example, cold rolling at a rolling reduction of 65% as disclosed in the examples increases the load on a roll, increases the risk of trouble, decreases productivity, and results in a limited product size.

PATENT LITERATURE

[PTL 1] Japanese Examined Patent Application Publication No. 57-57945
[PTL 2] Japanese Examined Patent Application Publication No. 55-10650
[PTL 3] Japanese Unexamined Patent Application Publication No. 2003-64444
[PTL 4] Japanese Unexamined Patent Application Publication No. 2002-226941
[PTL 5] Japanese Unexamined Patent Application Publication No. 2005-120467
[PTL 6] Japanese Patent No. 4501699

SUMMARY OF THE INVENTION

In order to increase the strength of a mild steel sheet having excellent deep drawability, a previously studied method for increasing the strength by solid-solution hardening requires the addition of a large amount of alloying element. This method has problems in terms of cost and coating property, as well as improvement of the r-value. A method utilizing structural hardening requires two times annealing and a high-speed cooling equipment. With respect to the method utilizing VC also disclosed, variations in dissolution rate of VC may cause variations in the material property. Thus, the annealing temperature and the annealing time must be precisely controlled, and leaves a problem in the manufacture stability. With respect to the technique for increasing the r-value by the effect of grain refinement of the hot-rolled steel sheet by the addition of Nb and the effect of decreasing the amount of solute C by the precipitation of NbC, Nb is not only very expensive but also significantly retards the recrystallization of austenite and consequently increases the load in hot rolling. Furthermore, NbC precipitated in the hot-rolled steel sheet increases deformation resistance in cold rolling and makes manufacture difficult.

The present invention aims to solve such problems of the prior art. The present invention proposes a high-strength galvanized steel sheet that has TS≥440 MPa, average r-value≥1.2, and λ≥80% and has excellent deep drawability and stretch flangeability and a method for manufacturing the high-strength galvanized steel sheet. The present invention provides a high-strength galvanized steel sheet that has a high r-value of average r-value≥1.2 and a high λ value of λ≥80% at a strength of TS≥500 MPa or even at a strength as high as TS≥590 MPa and has excellent deep drawability and stretch flangeability and a method for manufacturing the high-strength galvanized steel sheet.

As a result of extensive studies to solve the problems described above, the present inventors have succeeded in obtaining a high-strength galvanized steel sheet that has TS≥440 MPa, an average r-value of 1.2 or more, and λ of 80% or more, has excellent deep drawability and stretch flangeability, and has a steel microstructure containing ferrite and martensite by controlling the Nb content in connection with the C content while the C content is in the range of 0.010% to 0.06% and controlling the amount of C not fixed by Nb or Ti (the amount of solute C) so as to satisfy a relation described below, without the addition of an excessive amount of alloying element or use of special equipment.

The gist of the present invention will be described below.

[1] A high-strength galvanized steel sheet having excellent deep drawability and stretch flangeability, containing: on a mass percent basis, C: 0.010% or more and 0.06% or less, Si: more than 0.5% and 1.5% or less, Mn: 1.0% or more and 3.0% or less, P: 0.005% or more and 0.1% or less, S: 0.01% or less, sol.Al: 0.005% or more and 0.5% or less, N, 0.01% or less, Nb: 0.010% or more and 0.090% or less, and Ti: 0.015% or more and 0.15% or less, the Nb and C contents (% by mass) of the steel satisfying the relation of (Nb/93)/(C/12)<0.20, C* given by the following formula (1) satisfying 0.005≤C*≤0.025, and the remainder being Fe and incidental impurities, wherein ferrite constitutes 70% by area ratio or more, martensite constitutes 3% by area ratio or more, the average r-value is 1.2 or more, and the hole expansion ratio (λ) is 80% or more:

$$C^* = C - (12/93)Nb - (12/48)\{Ti - (48/14)N\} \quad (1)$$

wherein C, Nb, Ti, and N denote the C, Nb, Ti, and N contents (% by mass) of the steel, respectively, provided that if Ti−(48/14)N≤0, then Ti−(48/14)N=0.

[2] The high-strength galvanized steel sheet having excellent deep drawability and stretch flangeability according to [1], further containing: on a mass percent basis, one or more of Mo, Cr, and V constituting 0.5% or less of the steel sheet in total.

[3] The high-strength galvanized steel sheet having excellent deep drawability and stretch flangeability according to [1] or [2], further containing: on a mass percent basis, one or two of Cu: 0.3% or less and Ni: 0.3% or less.

[4] The high-strength galvanized steel sheet having excellent deep drawability and stretch flangeability according to any one of [1] to [3], further containing: on a mass percent basis, one or two of Sn: 0.2% or less and Sb: 0.2% or less.

[5] The high-strength galvanized steel sheet having excellent deep drawability and stretch flangeability according to any one of [1] to [4], further containing: on a mass percent basis, Ta: 0.005% or more and 0.1% or less, wherein C* given by the following formula (2) instead of the formula (1) satisfies the relation of 0.005≤C*≤0.025:

$$C^* = C - (12/93)Nb - (12/181)Ta - (12/48)\{Ti - (48/14)N\} \quad (2)$$

wherein C, Nb, Ta, Ti, and N denote the C, Nb, Ta, Ti, and N contents (% by mass) of the steel, respectively, provided that if Ti−(48/14)N≤0, then Ti−(48/14)N=0.

[6] A method for manufacturing a high-strength galvanized steel sheet having excellent deep drawability and stretch flangeability, including: hot rolling and cold rolling a steel having the composition described in any one of [1] to [5]; heating the steel in the temperature range of 700° C. to 800° C. at an average heating rate of less than 3° C./sec.; annealing the steel at a temperature in the range of 800° C. to 950° C.; cooling the steel from the annealing temperature at an average cooling rate in the range of 3° C./sec. to 15° C./sec.; immersing the steel in a galvanizing bath for hot-dip galvanizing; and cooling the steel at an average cooling rate in the range of 5° C./sec. to 100° C./sec. after the hot-dip galvanizing, or performing alloying treatment of the galvanized steel after the hot-dip galvanizing and cooling the steel at an average cooling rate in the range of 5° C./sec. to 100° C./sec. after the alloying treatment.

[7] The method for manufacturing a high-strength galvanized steel sheet having excellent deep drawability and stretch flangeability according to [6], further including: starting cooling within three seconds after the hot rolling; cooling the steel to 650° C. at an average cooling rate of 40° C./sec. or more; coiling the steel at a coiling temperature in the range of 500° C. to 650° C.; and cold rolling the steel at a rolling reduction of 50% or more.

According to an embodiment of the present invention, the Nb content and the C content are controlled so as to satisfy a relation described below at a C content in the range of 0.010% to 0.06%, and the amount of C not fixed by Nb or Ti (the amount of solute C) is controlled so as to satisfy the relation described above. This allows a {111} recrystallization texture to be grown, thereby achieving an average r-value≥1.2 and satisfactory deep drawability. According to an embodiment of the present invention, the addition of Si increases the strength of a ferrite main phase. This decreases the difference in hardness between the ferrite main phase and a second phase and achieves a hole expansion ratio (λ)≥80% and satisfactory stretch flangeability. According to the present invention, a steel microstructure containing ferrite and martensite can achieve strength as high as TS 440 MPa or more.

DESCRIPTION OF EMBODIMENTS OF THE INVENTION

The present invention will be described in detail below with reference to exemplary embodiments.

First, the composition of steel will be described below. Unless otherwise specified, % of the components refers to % by mass.

C: 0.010% or More and 0.06% or Less

C can form martensite and increase strength. Less than 0.010% C can rarely form martensite, resulting in an unsatisfactory area ratio of martensite and a strength of less than 440 MPa. On the other hand, more than 0.06% C results in an excessive increase in the area ratio of martensite and a decrease in the area ratio of ferrite, and satisfactory r-value (r-value≥1.2) and λ-value (λ≥80%) cannot be achieved. Thus, the C content is 0.010% or more and 0.06% or less.

Si: More than 0.5% and 1.5% or Less

Si can promote ferrite transformation, increase the amount of C in untransformed austenite, facilitate the formation of a dual phase microstructure of ferrite and martensite, have a solid-solution hardening effect, and is effective in increasing strength. Furthermore, Si can harden a ferrite phase to decrease the difference in hardness between the ferrite phase and a martensite phase and is effective in increasing λ. These effects require more than 0.5% Si, preferably 0.8% or more Si, more preferably more than 1.0% Si. On the other hand, more than 1.5% Si causes red scale in hot rolling, impairs surface appearance after coating, and impairs coating wettability in hot-dip galvanizing, resulting in uneven coating and low coating quality. Thus, the Si content is 1.5% or less, preferably 1.3% or less.

Mn: 1.0% or More and 3.0% or Less

Mn is effective for the formation of martensite, improves quenching hardenability, and stably forms martensite. Less than 1.0% Mn can rarely form martensite and results in an insufficient area ratio of martensite, which sometimes makes it impossible to achieve a strength of 440 MPa or more. Thus, in order to achieve the desired strength, the Mn content is 1.0% or more, preferably 1.2% or more, more preferably 1.5% or more. However, the addition of more than 3.0% Mn results in not only an increase in cost but also deterioration of the r-value and weldability. Thus, the Mn content is 1.0% or more and 3.0% or less, preferably 1.2% or more and 3.0% or less, more preferably 1.5% or more and 3.0% or less.

P: 0.005% or More and 0.1% or Less

P is a solid-solution hardening element and is effective in increasing strength. However, a P content of less than 0.005% not only fails to produce such effects but also results in an increase in dephosphorization cost in the steelmaking process. Thus, the P content is 0.005% or more, preferably 0.01% or more. However, a P content of more than 0.1% results in the segregation of P in a grain boundary, low anti-secondary working embrittlement, and poor weldability. Furthermore, in the case of a galvanized steel sheet, this retards the diffusion of Fe from the steel sheet to a coating layer at an interface between the coating layer and the steel sheet in alloying treatment after hot-dip galvanizing, thus deteriorates alloying treatment. In order to compensate for these, alloying treatment at high temperature is required, and the resulting coating layer is liable to peeling, such as powdering or chipping. Thus, the upper limit of the P content is 0.1%, preferably 0.06% or less, more preferably less than 0.035%.

S: 0.01% or Less

S causes hot shortness and deteriorating workability of steel sheet due to the presence as a sulfide-based inclusion in steel. Thus, the S content is 0.01% or less.

sol.Al: 0.005% or More and 0.5% or Less

Al is a solid-solution hardening element and is effective in increasing strength. Al serves as a deoxidation element and can decrease inclusions in steel. However, less than 0.005% sol.Al cannot stably obtain such effects. Thus, the sol.Al content is 0.005% or more. On the other hand, a sol.Al content of more than 0.5% results in an increase in cost and a surface defect. Thus, the upper limit of the sol.Al content is 0.5%, preferably 0.1%.

N: 0.01% or Less

The N content is preferably minimized. More than 0.01% N results in the formation of excessive nitride and low ductility, toughness, and surface appearance quality. Thus, the N content is 0.01% or less.

Nb: 0.010% or More and 0.090% or Less

Nb is one of the important elements in the present invention. Nb can decrease the size of a hot-rolled steel sheet microstructure and is precipitated as NbC in a hot-rolled steel sheet to fix C in the steel. Because of these effects, Nb contributes to a high r-value. In order to obtain these effects, in the present invention, the Nb content is preferably 0.010% or more. However, an excessive Nb content of more than 0.090% results in increases in cost, hot rolling load, and deformation resistance in cold rolling and may makes manufacture difficult. Furthermore, as described below, solute C for forming martensite in a cooling process after annealing is required. However, an excessive Nb content of more than 0.090% results in fixation of the entire C in steel as NbC and inhibits the formation of martensite. Thus, the Nb content is 0.010% or more and 0.090% or less, preferably 0.010% or more and 0.075% or less.

Ti: 0.015% or More and 0.15% or Less

Ti is one of the important elements in the present invention. In the same manner as in Nb, Ti is precipitated as carbide (TiC) in a hot-rolled steel sheet to fix C. Because of this effect, Ti contributes to a high r-value. In order to obtain these effects, in the present invention, the Ti content is preferably 0.015% or more. However, an excessive Ti content of more than 0.15% results in an increase in cost, and in the same manner as in Nb, an increase in deformation resistance in cold rolling, and may make manufacture difficult. In the same manner as in Nb, an excessive Ti content of more than 0.15% may inhibit the formation of martensite in a cooling process after annealing. Thus, the Ti content is 0.015% or more and 0.15% or less.

$(Nb/93)/(C/12) < 0.20$ and $0.005 \leq C^* \leq 0.025$ $C^*$ is given by the following formula (1) (the formula (2) in the case of Ta-containing steel):

$$C^* = C - (12/93)Nb - (12/48)\{Ti - (48/14)N\} \quad (1)$$

wherein C, Nb, Ti, and N denote the C, Nb, Ti, and N contents (% by mass) of the steel, respectively. $C^*$ denotes the amount of C not fixed by Nb or Ti (the amount of solute C). If $Ti - (48/14)N \leq 0$, then $Ti - (48/14)N = 0$.

$(Nb/93)/(C/12)$ and $C^*$ are the most important indexes in the present invention. As compared with Ti, Nb is very expensive, may markedly increase rolling load in hot rolling, and may reduce manufacturing stability. As described above, the formation of martensite in the cooling process after annealing requires C not fixed by Nb or Ti, that is, solute C ($C^*$). Thus, from the standpoints of cost, manufacturing stability, microstructure, and mechanical property, $(Nb/93)/(C/12)$ and $C^*$ must be appropriately controlled.

$(Nb/93)/(C/12)$ of 0.20 or more results in high cost because of an increase in the expensive Nb content, and an increase in load in hot rolling. Thus, $(Nb/93)/(C/12)$ is less than 0.20. $C^*$ of less than 0.005 results in an insufficient amount of martensite, which makes it difficult to achieve a strength of 440 MPa or more. Thus, $C^*$ is 0.005 or more. However, $C^*$ of more than 0.025 may result in a decrease in the formation of a {111} recrystallization texture of ferrite, which is effective in increasing the r-value, and unsatisfactory deep drawability. $C^*$ of more than 0.025 may also result in an increase in the area ratio of martensite, a decrease in λ, and unsatisfactory stretch flangeability. Thus, $C^*$ is 0.005 or more and 0.025 or less. In order to achieve an average r-value of 1.3 or more, $C^*$ is preferably 0.020 or less. In order to achieve an average r-value of 1.4 or more, $C^*$ is preferably less than 0.017.

These are the basic components of a steel sheet according to embodiments of the present invention. In addition to these basic components, a steel sheet according to the present invention may contain one or more of Mo, Cr, and V and/or one or two of Cu and Ni and/or one or two of Sn and Sb and/or Ta, if necessary.

Total of One or More of Mo, Cr, and V: 0.5% or Less

In the same manner as in Mn, Mo, Cr, and V are effective in enhancing quenching hardenability and stably forming martensite. These effects are noticeable when their total content is 0.1% or more. However, when one or two or more of these elements constitute more than 0.5% in total, this results in the saturation of these effects and an increase in cost. Thus, the total content of one or two or more of these elements is preferably 0.50 or less.

One or Two of Cu: 0.3% or Less and Ni: 0.3% or Less

Cu can be incorporated when scraps are actively used. In the present invention, the allowance of Cu contamination permits using recycled resources as raw materials and results in a decrease in manufacturing costs. Although Cu has little influence on the properties of a steel sheet according to the present invention, excessive Cu may cause a surface flaw of the steel sheet. Thus, the Cu content is preferably 0.3% or less.

Although Ni also has little influence on the properties of a steel sheet, Ni is effective in reducing the number of surface flaws of the steel sheet in the presence of Cu. This effect is noticeable when the Ni content is half the Cu content. Thus, when Ni is added, the lower limit of the Ni content is preferably half the Cu content. However, the addition of excessive Ni can cause a surface defect of a steel sheet resulting from ununiform scale. Thus, the Ni content is preferably 0.3% or less.

One or Two of Sn: 0.2% or Less and Sb: 0.2% or Less

Sn can prevent nitriding or oxidation of a surface of a steel sheet and decarbonization of a region having a thickness of several tens of micrometers in an oxidized steel sheet surface layer. This can improve fatigue property and anti-aging property. The Sn content is desirably 0.005% or more so as to prevent nitriding or oxidation. More than 0.2% Sn results in deterioration of toughness. Thus, the Sn content is desirably 0.2% or less.

In the same manner as in Sn, Sb can prevent nitriding or oxidation of a surface of a steel sheet and decarbonization of a region having a thickness of several tens of micrometers in an oxidized steel sheet surface layer. The prevention of nitriding or oxidation can prevent a decrease in the formation of martensite on a surface of a steel sheet and improve fatigue property and anti-aging property. In order to prevent nitriding or oxidation, the Sb content is desirably 0.005% or more. However, more than 0.2% Sb results in deterioration of toughness. Thus, the Sb content is desirably 0.2% or less.

Ta: 0.005% or More and 0.1% or Less

In the same manner as in Nb or Ti, Ta is precipitated as carbide (TaC) in a hot-rolled steel sheet and contributes to a high r-value. Thus, 0.005% or more Ta may be added. However, the addition of an excessive amount of Ta of more than 0.1% not only results in an increase in cost but also may prevent the formation of martensite in a cooling process after annealing in the same manner as in Nb or Ti. Furthermore, TaC precipitated in a hot-rolled steel sheet may increase deformation resistance in cold rolling and make manufacture difficult. Thus, the upper limit of the Ta content is desirably 0.1%.

When the Ta content is in the range described above, the C, Nb, Ta, Ti, and N contents are controlled so as to satisfy $0.005 \leq C^* \leq 0.025$. $C^*$ is given by the following formula (2):

$$C^* = C - (12/93)Nb - (12/181)Ta - (12/48)\{Ti - (48/14)N\} \quad (2)$$

wherein C, Nb, Ta, Ti, and N denote the C, Nb, Ta, Ti, and N contents (% by mass) of the steel, respectively, provided that if $Ti - (48/14)N \leq 0$, then $Ti - (48/14)N = 0$.

$C^*(=C-(12/93)Nb-(12/181)Ta-(12/48)\{Ti-(48/14)N\})$ of less than 0.005 results in an insufficient area ratio of martensite, which makes it impossible to achieve a strength of 440 MPa or more. Thus, $C^*$ is 0.005 or more. However, $C^*$ of more than 0.025 results in a decrease in the formation of a {111} recrystallization texture of a ferrite phase, which is effective in increasing the r-value, possibly making it difficult to achieve a satisfactory r-value (average r-value: 1.2 or more).

Thus, $C^*$ is preferably 0.025 or less. In order to consistently achieve an average r-value of 1.3 or more, $C^*$ is preferably 0.020 or less. In order to achieve an average r-value of 1.4 or more, $C^*$ is more preferably less than 0.017.

The components of a steel sheet according to the present invention other than the components described above are Fe and incidental impurities. An example of the incidental impurities is oxygen (O). Oxygen (O) forms a non-metallic inclusion and adversely affects the quality of the steel sheet. The oxygen (O) content is preferably decreased to 0.003% or less.

The following are reasons for defining the preferred microstructure of a steel sheet according to the present invention.

Ferrite constitutes 70% at an area ratio or more and martensite constitutes 3% at an area ratio or more of the microstructure of a steel sheet according to an embodiment of the present invention. In order to achieve the desired strength and press formability (in particular, deep drawability) of a steel sheet, the present invention defines the area ratios of ferrite and martensite.

Ferrite: 70% at an Area Ratio or More

Ferrite is a soft phase for achieving the desired press formability, particularly deep drawability, of a steel sheet. In the present invention, the {111} recrystallization texture of ferrite is grown to increase the r-value. When the area ratio of ferrite is less than 70%, it is difficult to achieve an average r-value of 1.2 or more, resulting in unsatisfactory deep drawability and poor press formability. Thus, the area ratio of ferrite is 70% or more. In order to further increase the average r-value, the area ratio of ferrite is preferably 75% or more, more preferably 80% or more. When the area ratio of ferrite is more than 97%, however, the strength of a steel sheet decreases, and it may be difficult to achieve a strength of 440 MPa or more.

The term "ferrite", as used herein, includes polygonal ferrite and bainitic ferrite, which is transformed from austenite and has a high dislocation density.

Martensite: 3% at an Area Ratio or More

Martensite is a hard phase for increasing the strength of a steel sheet. When the area ratio of martensite is less than 3%, the steel sheet has a low strength and rarely has a strength of 440 MPa or more. Thus, the area ratio of martensite is 3% or more. In order to further increase the strength of a steel sheet, the area ratio of martensite is preferably 5% or more. When the area ratio of martensite is more than 30%, however, the area ratio of ferrite that can improve the r-value decreases, and it is difficult to achieve satisfactory deep drawability. An increase in the hard martensite phase results in an increase in the interface between the martensite phase and the ferrite phase, a marked increase in the occurrence of voids in punching, deterioration of stretch flangeability, and deterioration of press formability. Thus, the area ratio of martensite is 30% or less, preferably 20% or less.

The phases other than ferrite and martensite in a steel sheet according to the present invention include pearlite, bainite, retained austenite, and inevitable carbides. The area ratio of these phases may be 5% or less (in total).

A method for manufacturing a galvanized steel sheet according to an embodiment of the present invention will be described below.

A steel sheet according to the present invention is manufactured by a hot-rolling process from molten steel having the composition described above, a cold-rolling process, an annealing and galvanizing process.

In the present invention, a method for melting steel is not particularly limited and may be a known melting method using a converter, an electric furnace, or the like. After the melting process, in consideration of segregation or the like, a steel slab is preferably produced by a continuous casting process. A steel slab may also be produced by a known casting process, such as an ingot making and blooming process or a thin slab continuous casting process. When the steel slab is hot-rolled after casting, the steel slab may be reheated in a furnace before rolling or, if the steel slab maintains a predetermined temperature or higher, may be directly hot-rolled without heating the steel slab.

(Hot-Rolling Process)

In the hot-rolling process, after the steel is heated, a rough rolling and finish rolling are performed. In the present invention, the heating conditions, the rough rolling conditions, and the finish rolling conditions of the steel are not particularly limited. When the steel is heated, the heating temperature is preferably 1100° C. or more and 1300° C. or less. The finishing temperature is preferably the $Ar_3$ transformation point or more and 1000° C. or less.

The coiling temperature is not particularly limited but is preferably in the range of 500° C. to 700° C. A coiling temperature of more than 700° C. may result in the coarsening of grain size and low strength as well as a low r-value after cold rolling and annealing. A coiling temperature of less than 500° C. makes the precipitation of NbC or TiC difficult and may be unfavorable for high r-value.

In order to increase the r-value by decreasing the grain size of a hot-rolled steel sheet, more preferably, the hot-rolled steel sheet is started to be cooled within three seconds after finish rolling, is cooled to 650° C. at an average cooling rate of 40° C./sec. or more, and is coiled at a coiling temperature in the range of 500° C. to 650° C.

In an embodiment of the present invention, $C^*$ of a hot-rolled steel sheet is adjusted in the range of 0.005 to 0.025 while the composition described above is satisfied. This can achieve both a high r-value and a high strength due to the dual phase. Furthermore, high cost and low productivity resulting from Nb in the steel can be greatly reduced by adjusting $(Nb/93)/(C/12)$ to less than 0.20. More specifically, $C^*$ is controlled by minimizing expensive Nb, which increases hot rolling load, and actively using Ti. Thus, the resulting steel sheet is inexpensive and has excellent manufacturability, a high r-value, and a high strength.

(Cold-Rolling Process)

The cold-rolling process may be performed in accordance with common procedures. After the hot-rolled steel sheet is pickled, the hot-rolled steel sheet is preferably cold-rolled at a rolling reduction of 50% or more. In order to increase the r-value, it is effective to increase the rolling reduction in cold rolling. A rolling reduction of less than 50% may result in insufficient growth of the {111} recrystallization texture of ferrite and poor deep drawability. Thus, the rolling reduction in cold rolling is preferably 50% or more. However, a rolling reduction of more than 90% may result in an increase in the load on a roll in cold rolling and an increase in the occurrence of trouble. Thus, the rolling reduction in cold rolling is preferably 90% or less.

(Annealing and Galvanizing Process)

The annealing process includes heating the cold-rolled steel sheet in the temperature range of 700° C. to 800° C. at an average heating rate of less than 3° C./sec., annealing the steel sheet at an annealing temperature in the range of 800° C. to 950° C., cooling the steel sheet from the annealing temperature at an average cooling rate in the range of 3° C./sec. to 15° C./sec., immersing the steel sheet in a galvanizing bath for hot-dip galvanizing, and after the hot-dip galvanizing cooling the steel sheet at an average cooling rate in the range of 5° C./sec. to 100° C./sec. When the galvanized steel after the hot-dip galvanizing is subjected to alloying treatment, the steel after the alloying treatment is cooled at an average cooling rate in the range of 5° C./sec. to 100° C./sec.

Average Heating Rate in Temperature Range of 700° C. to 800° C.: Less than 3° C./Sec.

In an embodiment of the present invention, TiC or NbC is precipitated in the hot-rolling process. Therefore the cold-rolled steel sheet has a relatively high recrystallization temperature. Thus, in order to promote recrystallization to grow the {111} recrystallization texture, which is effective in increasing the r-value, the cold-rolled steel sheet is heated to the annealing temperature at an average heating rate of less than 3° C./sec. in the temperature range of 700° C. to 800° C. An average heating rate of 3° C./sec. or more may result in insufficient growth of the {111} recrystallization texture and a low r-value. In terms of production efficiency, the average heating rate is preferably 0.5° C./sec. or more.

Annealing Temperature: 800° C. to 950° C.

In order to obtain a dual phase of ferrite and martensite in the desired area ratio, the annealing process needs heating in a ferrite-austenite region. Thus, in the present invention, the annealing temperature is preferably 800° C. or more. An annealing temperature of less than 800° C. results in an insufficient amount of martensite after annealing and cooling, incomplete recrystallization and insufficient growth of the {111} recrystallization texture of ferrite in the annealing process, and a low average r-value of less than 1.2. On the other hand, an annealing temperature of more than 950° C. may result in an excessive increase in a second phase (martensite, pearlite, or bainite) depending on the cooling conditions, an insufficient area ratio of ferrite, an unsatisfactory r-value, low productivity, and high energy cost. Thus, the annealing temperature is in the range of 800° C. to 950° C., preferably 820° C. to 880° C.

In order to promote the concentration of an alloying element, such as C, in austenite, and the growth of the {111} recrystallization texture of ferrite, the annealing time is preferably 15 seconds or more. However, an annealing time of more than 300 seconds may result in the coarsening of grain size, low strength, poor surface property, and deterioration of other properties of the steel sheet. An annealing time of more than 300 seconds also results in a very low line speed in a continuous galvanizing line and low productivity. Thus, the annealing time is preferably in the range of 15 to 300 seconds, more preferably 15 to 200 seconds.

Average Cooling Rate from Annealing Temperature to Galvanizing Bath Temperature (Primary Cooling Rate): 3 to 15° C./Sec.

After soaking at the annealing temperature, the steel sheet is cooled to the galvanizing bath temperature, which is generally in the range of 400° C. to 500° C., at an average cooling rate of 3 to 15° C./sec. When the average cooling rate is less than 3° C./sec., the steel sheet passes through a pearlite nose at a temperature in the range of 550° C. to 650° C., which may result in the formation of a large amount of pearlite and bainite in a second phase, an insufficient amount of martensite, and low strength. On the other hand, an average cooling rate of more than 15° C./sec. results in insufficient concentration of Mn, C, or another element in γ at the transformation from austenite(γ) to ferrite(α)) during cooling from the annealing temperature. In the alloying treatment, this tends to result in the formation of pearlite, an insufficient amount of martensite, and low strength. Thus, the average cooling rate from the annealing temperature to the galvanizing bath is in the range of 3 to 15° C./sec., preferably 5 to 15° C./sec.

If necessary, the galvanized steel sheet by hot dip galvanizing may be followed by alloying treatment. In this case, the alloying treatment of the galvanized steel may involve heating the galvanized steel to a temperature in the range of 500° C. to 700° C. after the hot-dip galvanizing and holding the temperature for several to several tens of seconds. According to the present invention steel, the cooling rate from the annealing temperature to the galvanizing bath is controlled as described above, and a large amount of pearlite is not formed in the alloying treatment as described above. This results in the formation of a predetermined amount of martensite and the desired strength. The galvanizing conditions include the amount of coating in the range of 20 to 70 $g/m^2$ per one side. For alloying, Fe % of the coating layer is preferably in the range of 6% to 15%.

Average Cooling Rate after Hot-Dip Galvanizing or after Alloying Treatment of Galvanized Steel (Secondary Cooling Rate): 5 to 100° C./sec.

The secondary average cooling rate at which the steel sheet is cooled to a temperature of 150° C. or less after the hot-dip galvanizing or after the alloying treatment of the galvanized steel is 5° C./sec. or more so as to stably form martensite. Slow cooling at a secondary cooling rate of less than 5° C./sec. may form pearlite or bainite at a temperature in the range of approximately 400° C. to 500° C., resulting in an insufficient amount of martensite, and low strength. On the other hand, with respect to the upper limit of the secondary cooling rate, a secondary cooling rate of more than 100° C./sec. results in excessively hard martensite and low ductility. Thus, the secondary cooling rate is preferably 100° C./sec. or less. Thus, the secondary cooling rate is in the range of 5 to 100° C./sec., preferably 10 to 100° C./sec.

In the present invention, after heat treatment, temper rolling or leveling may be performed so as to correct the shape and control the surface roughness of the steel sheet. The temper rolling is preferably performed at an elongation ratio in the range of approximately 0.3% to 1.5%.

Example 1

The present invention will be further described in the following examples.

A steel containing the chemical components shown in Table 1 was melted under vacuum, was casted, and was subjected to blooming to form a steel slab having a thickness of 30 mm. The steel slab was heated to 1200° C., was hot-rolled at a finish-rolling temperature (finishing temperature) of 880° C., was cooled under conditions described in Table 2, and was coiled at 600° C. to manufacture a hot-rolled steel sheet having a thickness of 4.5 mm. In the hot-rolling process, cooling was started within three seconds after finish rolling. The hot-rolled steel sheet was pickled and was cold-rolled at a rolling reduction of 69% to manufacture a cold-rolled steel sheet having a thickness of 1.4 mm.

A sample cut from the cold-rolled steel sheet was annealed in an infrared image furnace at an annealing temperature and a retention time described in Table 2 and was subjected to primary cooling under conditions described in Table 2, hot-dip galvanizing (a galvanizing bath temperature: 460° C.), alloying treatment (520° C.×20 seconds), secondary cooling to a temperature of 150° C. or less, and temper rolling at an elongation ratio of 0.5%. The amount of coating was 50 g/m² per one side, and the alloying treatment was controlled such that Fe % in the coating layer was in the range of 9% to 12%.

TABLE 1

| Steel No. | Chemical compositions (% by mass) | | | | | | | | | | | (Nb/93)/(C/12) | $C^*(=C-(12/93)Nb-(12/48)[Ti-(48/14)N])$ | $C^*(=C-(12/93)Nb-(12/181)Ta-(12/48)[Ti-(48/14)N])$ | Note |
|---|---|---|---|---|---|---|---|---|---|---|---|---|---|---|---|
| | C | Si | Mn | P | S | sol. Al | N | Nb | Ti | Ta | Others | | | | |
| A | 0.008 | 0.3 | 1.6 | 0.055 | 0.005 | 0.055 | 0.0031 | 0.012 | 0.019 | — | — | 0.19 | 0.004 | — | Comparative steel |
| B | 0.014 | 0.6 | 0.8 | 0.062 | 0.005 | 0.074 | 0.0016 | 0.018 | 0.022 | — | — | 0.17 | 0.008 | — | Comparative steel |
| C | 0.014 | 0.7 | 1.4 | 0.044 | 0.003 | 0.029 | 0.0022 | 0.016 | 0.017 | — | Mo: 0.10 Cr: 0.15 V: 0.24 | 0.15 | 0.010 | — | Inventive steel |
| D | 0.013 | 0.7 | 1.1 | 0.052 | 0.005 | 0.038 | 0.0021 | 0.019 | 0.017 | — | — | 0.19 | 0.008 | — | Inventive steel |
| E | 0.018 | 0.9 | 1.4 | 0.044 | 0.003 | 0.035 | 0.0020 | 0.021 | 0.019 | — | Cu: 0.22 Ni: 0.11 | 0.15 | 0.012 | — | Inventive steel |
| F | 0.019 | 1.3 | 1.5 | 0.042 | 0.004 | 0.033 | 0.0023 | 0.022 | 0.018 | — | — | 0.15 | 0.014 | — | Inventive steel |
| G | 0.028 | 1.0 | 1.7 | 0.044 | 0.002 | 0.066 | 0.0021 | 0.024 | 0.060 | — | — | 0.11 | 0.012 | — | Inventive steel |
| H | 0.027 | 1.3 | 1.7 | 0.039 | 0.003 | 0.055 | 0.0022 | 0.022 | 0.055 | — | — | 0.11 | 0.012 | — | Inventive steel |
| I | 0.028 | 1.0 | 2.1 | 0.034 | 0.002 | 0.043 | 0.0023 | 0.035 | 0.047 | — | — | 0.16 | 0.014 | — | Inventive steel |
| J | 0.029 | 1.3 | 2.0 | 0.038 | 0.003 | 0.041 | 0.0025 | 0.038 | 0.044 | — | — | 0.17 | 0.015 | — | Inventive steel |
| K | 0.035 | 1.3 | 1.9 | 0.033 | 0.002 | 0.039 | 0.0025 | 0.018 | 0.061 | — | — | 0.07 | 0.020 | — | Inventive steel |
| L | 0.038 | 1.4 | 2.0 | 0.034 | 0.003 | 0.052 | 0.0021 | 0.019 | 0.081 | — | — | 0.06 | 0.017 | — | Inventive steel |
| M | 0.037 | 0.9 | 2.1 | 0.035 | 0.005 | 0.041 | 0.0023 | 0.018 | 0.078 | — | — | 0.06 | 0.017 | — | Inventive steel |
| N | 0.038 | 0.2 | 2.0 | 0.033 | 0.004 | 0.044 | 0.0022 | 0.020 | 0.079 | — | — | 0.07 | 0.018 | — | Comparative steel |
| O | 0.043 | 1.0 | 2.2 | 0.063 | 0.002 | 0.12 | 0.0021 | 0.024 | 0.122 | — | — | 0.07 | 0.011 | — | Inventive steel |
| P | 0.044 | 1.0 | 2.1 | 0.054 | 0.002 | 0.038 | 0.0023 | 0.045 | 0.112 | — | — | 0.13 | 0.012 | — | Inventive steel |
| Q | 0.044 | 1.0 | 2.2 | 0.033 | 0.002 | 0.045 | 0.0022 | 0.064 | 0.105 | — | — | 0.19 | 0.011 | — | Inventive steel |
| R | 0.059 | 1.1 | 2.1 | 0.028 | 0.005 | 0.038 | 0.0033 | 0.074 | 0.113 | — | — | 0.16 | 0.019 | — | Inventive steel |
| S | 0.057 | 1.3 | 2.0 | 0.024 | 0.008 | 0.074 | 0.0045 | 0.077 | 0.115 | — | — | 0.17 | 0.022 | — | Inventive steel |
| T | 0.055 | 1.5 | 2.0 | 0.024 | 0.008 | 0.033 | 0.0045 | 0.115 | 0.012 | — | — | 0.27 | 0.040 | — | Comparative steel |
| U | 0.068 | 1.8 | 2.1 | 0.011 | 0.005 | 0.047 | 0.0023 | 0.022 | 0.144 | — | — | 0.04 | 0.031 | — | Comparative steel |
| V | 0.015 | 0.7 | 1.3 | 0.042 | 0.004 | 0.042 | 0.0025 | 0.020 | 0.016 | 0.04 | Sn: 0.02 | 0.17 | — | 0.008 | Inventive steel |
| W | 0.023 | 0.8 | 2.0 | 0.052 | 0.005 | 0.038 | 0.0029 | 0.018 | 0.055 | — | — | 0.10 | 0.009 | — | Inventive steel |
| X | 0.024 | 0.9 | 2.0 | 0.055 | 0.005 | 0.033 | 0.0029 | 0.021 | 0.045 | 0.05 | Sn: 0.02 Sb: 0.03 | 0.11 | — | 0.009 | Inventive steel |
| Y | 0.034 | 1.1 | 2.1 | 0.056 | 0.005 | 0.038 | 0.0023 | 0.025 | 0.082 | — | — | 0.09 | 0.012 | — | Inventive steel |
| Z | 0.032 | 1.0 | 2.1 | 0.061 | 0.003 | 0.035 | 0.0021 | 0.022 | 0.071 | 0.03 | Sn: 0.03 | 0.09 | — | 0.011 | Inventive steel |
| AA | 0.048 | 0.9 | 2.1 | 0.052 | 0.005 | 0.038 | 0.0025 | 0.015 | 0.115 | 0.02 | Sn: 0.03 | 0.04 | — | 0.018 | Inventive steel |
| AB | 0.059 | 1.1 | 2.1 | 0.033 | 0.003 | 0.031 | 0.0041 | 0.081 | 0.102 | 0.09 | Sn: 0.08 Sb: 0.03 | 0.18 | — | 0.021 | Inventive steel |

If Ti—(48/14)N ≤ 0, then Ti—(48/14)N = 0

TABLE 2

| | | Hot rolling | | Cold rolling Rolling reduction (%) | Annealing and galvanizing | | | | | | |
|---|---|---|---|---|---|---|---|---|---|---|---|
| Steel sheet No. | Steel No. | Average cooling rate after finish rolling (° C./sec.)*1 | Coiling temperature (° C.) | | 700-800° C. average heating rate (° C./sec.) | Annealing temperature (%) | Holding time at annealing temperature (sec.) | Primary cooling rate (° C./sec.)*2 | Alloying conditions | Secondary cooling rate (° C./sec.)*3 | Temper rolling Elongation ratio (%) |
| 1 | A | 20 | 600 | 69 | 2.0 | 840 | 60 | 10 | 520° C. × 20 s | 30 | 0.5 |
| 2 | B | 20 | 600 | 69 | 2.0 | 850 | 60 | 10 | 520° C. × 20 s | 30 | 0.5 |
| 3 | C | 20 | 600 | 69 | 2.0 | 840 | 60 | 10 | 520° C. × 20 s | 30 | 0.5 |
| 4 | D | 20 | 600 | 69 | 2.0 | 850 | 60 | 10 | 520° C. × 20 s | 30 | 0.5 |
| 5 | E | 20 | 600 | 69 | 2.0 | 850 | 60 | 10 | 520° C. × 20 s | 30 | 0.5 |
| 6 | F | 20 | 600 | 69 | 2.0 | 850 | 60 | 10 | 520° C. × 20 s | 30 | 0.5 |
| 7 | G | 20 | 600 | 69 | 2.0 | 840 | 60 | 10 | 520° C. × 20 s | 30 | 0.5 |

TABLE 2-continued

| | | Hot rolling | | Cold | Annealing and galvanizing | | | | | | |
|---|---|---|---|---|---|---|---|---|---|---|---|
| Steel sheet No. | Steel No. | Average cooling rate after finish rolling (° C./sec.)*1 | Coiling temperature (° C.) | rolling Rolling reduction (%) | 700-800° C. average heating rate (° C./sec.) | Annealing temperature (%) | Holding time at annealing temperature (sec.) | Primary cooling rate (° C./sec.)*2 | Alloying conditions | Secondary cooling rate (° C./sec.)*3 | Temper rolling Elongation ratio (%) |
| 8 | H | 20 | 600 | 69 | 2.0 | 850 | 60 | 10 | 520° C. × 20 s | 30 | 0.5 |
| 9 | I | 20 | 600 | 69 | 2.0 | 840 | 60 | 10 | 520° C. × 20 s | 30 | 0.5 |
| 10 | J | 20 | 600 | 69 | 2.0 | 850 | 60 | 10 | 520° C. × 20 s | 30 | 0.5 |
| 11 | K | 20 | 600 | 69 | 2.0 | 850 | 60 | 10 | 520° C. × 20 s | 30 | 0.5 |
| 12 | L | 20 | 600 | 69 | 2.0 | 860 | 60 | 10 | 520° C. × 20 s | 30 | 0.5 |
| 13 | M | 20 | 600 | 69 | 2.0 | 850 | 60 | 10 | 520° C. × 20 s | 30 | 0.5 |
| 14 | <u>N</u> | 20 | 600 | 69 | 2.0 | 850 | 60 | 10 | 520° C. × 20 s | 30 | 0.5 |
| 15 | O | 20 | 600 | 69 | 2.0 | 860 | 60 | 10 | 520° C. × 20 s | 30 | 0.5 |
| 16 | P | 20 | 600 | 69 | 2.0 | 860 | 60 | 10 | 520° C. × 20 s | 30 | 0.5 |
| 17 | Q | 20 | 600 | 69 | 2.0 | 850 | 60 | 10 | 520° C. × 20 s | 30 | 0.5 |
| 18 | R | 20 | 600 | 69 | 2.0 | 860 | 60 | 10 | 520° C. × 20 s | 30 | 0.5 |
| 19 | S | 20 | 600 | 69 | 2.0 | 860 | 60 | 10 | 520° C. × 20 s | 30 | 0.5 |
| 20 | <u>T</u> | 20 | 600 | 69 | 2.0 | 850 | 60 | 10 | 520° C. × 20 s | 30 | 0.5 |
| 21 | <u>U</u> | 20 | 600 | 69 | 2.0 | 850 | 60 | 10 | 520° C. × 20 s | 30 | 0.5 |
| 22 | V | 20 | 600 | 69 | 2.0 | 850 | 60 | 10 | 520° C. × 20 s | 30 | 0.5 |
| 23 | W | 20 | 600 | 69 | 2.0 | 840 | 60 | 10 | 520° C. × 20 s | 30 | 0.5 |
| 24 | X | 20 | 600 | 69 | 2.0 | 840 | 60 | 10 | 520° C. × 20 s | 30 | 0.5 |
| 25 | Y | 20 | 600 | 69 | 2.0 | 840 | 60 | 10 | 520° C. × 20 s | 30 | 0.5 |
| 26 | Z | 20 | 600 | 69 | 2.0 | 850 | 60 | 10 | 520° C. × 20 s | 30 | 0.5 |
| 27 | AA | 20 | 600 | 69 | 2.0 | 850 | 60 | 10 | 520° C. × 20 s | 30 | 0.5 |
| 28 | AB | 20 | 600 | 69 | 2.0 | 850 | 60 | 10 | 520° C. × 20 s | 30 | 0.5 |

*1After finish rolling, average cooling rate from the start of cooling to 650° C.
*2Average cooling rate from annealing temperature to galvanizing bath temperature
*3After hot-dip galvanizing or after alloying treatment of galvanized steel, average cooling rate to a temperature of 150° C. or less A sample cut from the galvanized steel sheet thus manufactured was subjected to microstructure observation and a tensile test to determine the area ratios of ferrite and martensite, tensile properties, average r-value, and λ-value. The test methods will be described below.

(i) Microstructure Observation

A test piece was taken from the galvanized steel sheet. An L section (a vertical section parallel to the rolling direction) of one-fourth positions of the thickness of the test piece was mechanically polished and was etched with nital. A microstructure photograph taken with a scanning electron microscope (SEM) at a magnification of 2000 times was used to determine the type of the microstructure and quantify the area ratio. In the microstructure photograph, ferrite appeared as a region of slightly black contrast, a region containing lamellar carbide was considered to be pearlite, a region containing carbide having a dot sequential pattern was considered to be bainite, and particles having white contrast were considered to be martensite or retained austenite. The area ratio of ferrite in the observation field can be quantified by determining the type of the microstructure. Whether the particles having white contrast were martensite or retained austenite was determined as follows: a microstructure photograph after tempering at 250° C. for four hours was taken in the same manner as described above. In the microstructure photograph, a region containing lamellar carbide was considered to be a region that was pearlite before the tempering, a region containing carbide having a dot sequential pattern was considered to be bainite or martensite before the tempering, and particles still having white contrast were considered to be retained austenite. From the area ratios of these, the difference between the area ratio of the particles having white contrast after tempering (retained austenite) and the area ratio of the particles having white contrast before tempering (martensite or retained austenite) was calculated to determine the area ratios of martensite and retained austenite. In this manner, the area ratio of martensite was determined. The area ratio of each phase was determined using image analysis software (Microsoft Corp., Digital Image Pro Plus) after coloring each phase differently on a transparent OHP sheet and performing binarization after image capturing.

(ii) Tensile Test

A JIS No. 5 test piece (JIS Z 2201) was sampled from the galvanized steel sheet such that the tensile direction was at an angle of 90 degrees (C direction) to the rolling direction, and was subjected to a tensile test in accordance with JIS Z 2241 to measure tensile strength (TS) and total elongation (EL).

(iii) Average Plastic Strain Ratio

JIS No. 5 test specimens were sampled from the galvanized steel sheet such that the tensile direction was at an angle of 0 degrees (L direction), 45 degrees (D direction), or 90 degrees (C direction) to the rolling direction. The true strains of the test specimens in the width direction and in the thickness direction were measured under 10% simple tensile strain. The average r-value (average plastic strain ratio) according to JIS Z 2254 was calculated from the measured values.

(iv) Hole Expansion Ratio λ

The stretch flangeability was evaluated in a hole expansion test according to the Japan Iron and Steel Federation standard JFST 1001. An opening having a diameter of 10 mm was punched in a 100 mm×100 mm square sample. The hole expansion test using a conical punch having a vertex angle of 60 degrees was continued until a crack passed through the sample in the thickness direction while a burr curled outward. The hole expansion ratio λ was calculated using the following equation, wherein $d_0$ denotes the initial diameter (=10 mm), and d denotes the diameter (mm) when a crack occurred:

$$\text{Hole expansion ratio } \lambda(\%) = \{(d-d_0)/d_0\} \times 100$$

Table 3 shows the results.

TABLE 3

| Steel sheet No. | Steel No. | Steel microstructure | | | Mechanical properties | | | | Note |
|---|---|---|---|---|---|---|---|---|---|
| | | Area ratio of ferrite (%) | Area ratio of martensite (%) | Others *4 | TS (MPa) | EL (%) | Average r-value | λ (%) | |
| 1 | A | 98 | 1 | P | 419 | 41.8 | 2.17 | 140 | Comparative example |
| 2 | B | 94 | 2 | P | 433 | 39.6 | 2.07 | 135 | Comparative example |
| 3 | C | 94 | 4 | P, B | 489 | 35.8 | 1.97 | 125 | Invention example |
| 4 | D | 96 | 3 | P, B | 465 | 37.6 | 1.68 | 130 | Invention example |
| 5 | E | 90 | 8 | P, B | 595 | 29.4 | 1.59 | 115 | Invention example |
| 6 | F | 90 | 7 | P, B | 558 | 31.9 | 1.69 | 130 | Invention example |
| 7 | G | 91 | 7 | P, B | 590 | 29.8 | 1.49 | 120 | Invention example |
| 8 | H | 90 | 7 | P, B | 558 | 31.9 | 1.57 | 135 | Invention example |
| 9 | I | 90 | 9 | P, B | 609 | 28.8 | 1.48 | 108 | Invention example |
| 10 | J | 91 | 8 | P, B | 582 | 30.6 | 1.55 | 125 | Invention example |
| 11 | K | 82 | 14 | P, B | 727 | 24.1 | 1.30 | 90 | Invention example |
| 12 | L | 84 | 12 | P, B | 677 | 25.8 | 1.34 | 101 | Invention example |
| 13 | M | 85 | 12 | P, B | 675 | 26.4 | 1.35 | 85 | Invention example |
| 14 | N | 85 | 13 | P, B | 698 | 24.4 | 1.30 | 70 | Comparative example |
| 15 | O | 89 | 7 | B, γ | 558 | 31.4 | 1.48 | 120 | Invention example |
| 16 | P | 88 | 8 | B, γ | 577 | 30.3 | 1.47 | 115 | Invention example |
| 17 | Q | 90 | 7 | B, γ | 561 | 31.2 | 1.46 | 114 | Invention example |
| 18 | R | 85 | 14 | B, γ | 717 | 24.4 | 1.30 | 95 | Invention example |
| 19 | S | 78 | 21 | B, γ | 740 | 23.6 | 1.23 | 84 | Invention example |
| 20 | T | 62 | 35 | B, γ | 775 | 22.6 | 0.80 | 60 | Comparative example |
| 21 | U | 64 | 32 | B, γ | 762 | 23.0 | 0.98 | 65 | Comparative example |
| 22 | V | 90 | 7 | P, B | 535 | 31.8 | 1.56 | 108 | Invention example |
| 23 | W | 86 | 10 | P, B | 605 | 28.1 | 1.51 | 98 | Invention example |
| 24 | X | 89 | 8 | P, B | 558 | 30.5 | 1.51 | 101 | Invention example |
| 25 | Y | 85 | 11 | P, B | 628 | 27.1 | 1.41 | 99 | Invention example |
| 26 | Z | 87 | 9 | P, B | 582 | 29.2 | 1.47 | 99 | Invention example |
| 27 | AA | 85 | 13 | P, B | 675 | 25.2 | 1.32 | 86 | Invention example |
| 28 | AB | 81 | 16 | B, γ | 744 | 22.8 | 1.21 | 96 | Invention example |

*4 P: pearlite, B: bainite, γ: retained austenite

The invention examples (steel sheets Nos. 3 to 13, 15 to 19, and 22 to 28) were steel sheets having TS of 440 MPa or more, an average r-value of 1.2 or more, and λ of 80% or more, and having satisfactory strength, deep drawability, and stretch frangeability. Invention examples having C* of 0.020% or less (steel sheets Nos. 3 to 13, 15 to 18, and 22 to 27) had an average r-value of 1.3 or more, and invention examples having C* of less than 0.017% (steel sheets Nos. 3 to 10, 15 to 17, and 22 to 26) had an average r-value of 1.4 or more. Thus, these invention examples had excellent deep drawability. Among invention examples having C* of less than 0.017% and substantially the same TS level (TS: 558 to 609 MPa) (steel sheets Nos. 5 to 10, 15 to 17, 23, 24, and 26), the steel sheets Nos. 6, 8, and 10 having a Si content in a preferred range (more than 1.0%) had higher λ than invention examples having a Si content of 1.0% or less (steel sheets Nos. 5, 7, 9, 15 to 17, 23, 24, and 26). Among invention examples having C* in the range of 0.017% to 0.020% and substantially the same TS level (TS: 675 to 727 MPa) (steel sheets Nos. 11 to 13, 18, and 27), the steel sheets Nos. 11, 12, and 18 having a Si content in a preferred range (more than 1.0%) had higher λ than invention examples having a Si content of 1.0% or less (steel sheets Nos. 13 and 27).

Among the comparative examples, a steel sheet No. 1 having C and Si contents and C* outside the scope of the present invention and a steel sheet No. 2 having a Mn content outside the scope of the present invention contained an insufficient amount of martensite and therefore had TS of less than 440 MPa. A steel sheet No. 14, which had a Si content outside the scope of the present invention, had λ of less than 80%. A steel sheet No. 20 having Ti and Nb contents outside the scope of the present invention and a steel sheet No. 21 having a C content outside the scope of the present invention had C* above the scope of the present invention, a low area ratio of ferrite, which is effective in increasing the r-value, an average r-value of less than 1.2, a high area ratio of hard martensite, an increased interface between martensite and the ferrite phase, and λ of less than 80%. The steel sheet No. 20 had a Nb content and (Nb/93)/(C/12) above the scope of the present invention and may therefore have poor manufacturability because of an increase in hot rolling load. The steel sheet No. 21 had a Si content above the scope of the present invention and may therefore have poor surface appearance because of red scale in hot rolling.

Example 2

Each of steels containing the chemical components listed for steel Nos. G, P, and R in Table 1 was melted under vacuum, was casted, and was subjected to blooming to form a slab having a thickness of 30 mm. The steel slab was heated to 1200° C. and was hot-rolled at a finish-rolling temperature (finishing temperature) of 880° C. to manufacture a hot-rolled steel sheet having a thickness of 4.5 mm. In the hot-rolling process, cooling was started within three seconds after finish rolling. After the start of cooling, the average cooling rate to 650° C. and the coiling temperature are shown in Table 4. The hot-rolled steel sheet was pickled and was cold-rolled at a rolling reduction of 69% to manufacture a cold-rolled steel sheet having a thickness of 1.4 mm. A sample cut from the cold-rolled steel sheet was annealed in an infrared image furnace at an annealing temperature and a retention time described in Table 4 and was subjected to primary cooling, hot-dip galvanizing (a galvanizing bath temperature: 460° C.), alloying treatment (520° C.×20 seconds), secondary cooling to a temperature of 150° C. or less, and temper rolling at an elongation ratio of 0.5%. A sample not subjected to alloying treatment was subjected to hot-dip galvanizing, secondary cooling to a temperature of 150° C. or less, and temper rolling at an elongation ratio of 0.5%. The amount of coating was 50 g/m² per one side, and the alloying treatment was controlled such that Fe % in the coating layer was in the range of 9% to 12%.

Nos. 29, 32 to 36, 40 to 46) were steel sheets having TS of 440 MPa or more, an average r-value of 1.2 or more, and λ of 80% or more, and having satisfactory strength, deep drawability, and stretch frangeability. Invention examples (steel sheet Nos. 32, 42, and 46) in which the average cooling rate after finish rolling was set at 40° C./sec. or more

TABLE 4

| Steel sheet No. | Steel No. | Hot rolling | | Cold rolling Rolling reduction (%) | Annealing and galvanizing | | | | | | |
|---|---|---|---|---|---|---|---|---|---|---|---|
| | | Average cooling rate after finish rolling (° C./sec.)*1 | Coiling temperature (° C.) | | 700-800° C. average heating rate (° C./sec.) | Annealing temperature (° C.) | Holding time at annealing temperature (sec.) | Primary cooling rate (° C./sec.)*2 | Alloying conditions | Secondary cooling rate (° C./sec.)*3 | Temper rolling Elongation ratio (%) |
| 29 | G | 20 | 600 | 69 | 2.0 | 840 | 60 | 10 | 520° C. × 20 s | 30 | 0.5 |
| 30 | | 30 | 650 | 69 | 1.5 | 780 | 60 | 10 | 520° C. × 20 s | 30 | 0.5 |
| 31 | | 30 | 630 | 69 | 1.0 | 980 | 60 | 15 | 520° C. × 20 s | 30 | 0.5 |
| 32 | | 70 | 600 | 69 | 2.0 | 840 | 60 | 10 | 520° C. × 20 s | 30 | 0.5 |
| 33 | | 20 | 650 | 69 | 2.0 | 840 | 60 | 5 | 520° C. × 20 s | 60 | 0.5 |
| 34 | | 20 | 490 | 69 | 2.0 | 840 | 60 | 5 | 520° C. × 20 s | 60 | 0.5 |
| 35 | | 30 | 600 | 69 | 1.5 | 850 | 10 | 5 | 520° C. × 20 s | 40 | 0.5 |
| 36 | | 20 | 600 | 69 | 1.5 | 830 | 350 | 5 | 520° C. × 20 s | 40 | 0.5 |
| 37 | | 20 | 600 | 69 | 2.0 | 840 | 60 | 2 | 520° C. × 20 s | 40 | 0.5 |
| 38 | | 20 | 600 | 69 | 2.0 | 840 | 60 | 20 | 520° C. × 20 s | 10 | 0.5 |
| 39 | | 20 | 600 | 69 | 2.0 | 850 | 100 | 5 | 520° C. × 20 s | 3 | 0.5 |
| 40 | | 20 | 600 | 69 | 2.0 | 840 | 60 | 5 | None | 10 | 0.5 |
| 41 | P | 20 | 600 | 69 | 2.0 | 860 | 60 | 10 | 520° C. × 20 s | 30 | 0.5 |
| 42 | | 70 | 600 | 69 | 2.0 | 860 | 60 | 10 | 520° C. × 20 s | 30 | 0.5 |
| 43 | | 20 | 600 | 69 | 2.0 | 860 | 60 | 15 | None | 10 | 0.5 |
| 44 | R | 20 | 600 | 69 | 2.0 | 860 | 60 | 10 | 520° C. × 20 s | 30 | 0.5 |
| 45 | | 30 | 650 | 69 | 1.5 | 850 | 200 | 10 | 520° C. × 20 s | 30 | 0.5 |
| 46 | | 50 | 600 | 69 | 2.0 | 860 | 60 | 10 | 520° C. × 20 s | 30 | 0.5 |
| 47 | | 20 | 600 | 69 | 5.0 | 850 | 60 | 10 | 520° C. × 20 s | 30 | 0.5 |

*1 After finish rolling, the average cooling rate from the start of cooling to 650° C.
*2 Average cooling rate from annealing temperature to galvanizing bath temperature
*3 After hot-dip galvanizing or after alloying treatment of galvanized steel, average cooling rate to a temperature of 150° C. or less In the same manner as in Example 1, a sample cut from the galvanized steel sheet thus manufactured was subjected to microstructure observation and a tensile test to determine the area ratios of ferrite and martensite, tensile properties, average r-value, and hole expansion ratio λ.

Table 5 shows the results.

in order to decrease the size of a hot-rolled steel sheet microstructure and thereby increase the r-value had a higher average r-value than other invention examples in which the average cooling rate after finish rolling was less than 40° C./sec.

TABLE 5

| Steel sheet No. | Steel No. | Steel microstructure | | | Mechanical properties | | | | Note |
|---|---|---|---|---|---|---|---|---|---|
| | | Area ratio of ferrite (%) | Area ratio of martensite (%) | Others *4 | TS (MPa) | EL (%) | Average r-value | λ (%) | |
| 29 | G | 91 | 7 | P, B | 590 | 29.8 | 1.49 | 120 | Invention example |
| 30 | | 100 | 0 | — | 420 | 41.7 | 1.14 | 145 | Comparative example |
| 31 | | 15 | 11 | P, B | 651 | 26.8 | 0.92 | 102 | Comparative example |
| 32 | | 90 | 9 | B | 605 | 29.3 | 1.60 | 108 | Invention example |
| 33 | | 92 | 6 | P, B | 577 | 29.8 | 1.39 | 119 | Invention example |
| 34 | | 91 | 7 | P, B | 602 | 28.5 | 1.33 | 115 | Invention example |
| 35 | | 89 | 7 | P, B | 598 | 29.4 | 1.43 | 115 | Invention example |
| 36 | | 92 | 7 | P, B | 581 | 30.2 | 1.61 | 115 | Invention example |
| 37 | | 88 | 1 | P, B | 419 | 41.8 | 2.00 | 140 | Comparative example |
| 38 | | 85 | 2 | P, B | 433 | 40.2 | 1.97 | 138 | Comparative example |
| 39 | | 84 | 1 | P, B | 428 | 41.1 | 1.98 | 139 | Comparative example |
| 40 | | 91 | 8 | P, B | 599 | 29.3 | 1.48 | 112 | Invention example |
| 41 | P | 88 | 8 | B, γ | 577 | 30.3 | 1.47 | 115 | Invention example |
| 42 | | 87 | 9 | B, γ | 605 | 29.1 | 1.59 | 108 | Invention example |
| 43 | | 89 | 10 | B, γ | 628 | 28.1 | 1.41 | 105 | Invention example |
| 44 | R | 85 | 14 | B, γ | 717 | 24.4 | 1.30 | 95 | Invention example |
| 45 | | 82 | 14 | B, γ | 721 | 24.8 | 1.30 | 94 | Invention example |
| 46 | | 84 | 14 | B, γ | 714 | 25.0 | 1.35 | 95 | Invention example |
| 47 | | 82 | 13 | B, γ | 698 | 25.1 | 1.09 | 97 | Comparative example |

*4 P: pearlite, B: bainite, γ: retained austenite

The invention examples that satisfied the manufacturing conditions according to the present invention (steel sheets Among the comparative examples, which did not satisfy the manufacturing conditions according to the present invention, a steel sheet No. 30 having an annealing temperature below the scope of the present invention had TS of less than 440 MPa. A steel sheet No. 31 having an annealing temperature above the scope of the present invention experienced annealing in an austenite single-phase region. Thus, ferrite effective in increasing the r-value was not formed in the subsequent cooling process, and the steel sheet No. 31 had an average r-value of less than 1.2. A steel sheet No. 37 had a primary cooling rate of less than 3° C./sec., which was outside the scope of the present invention, and passed through a pearlite nose at a temperature in the range of 550° C. to 650° C. Thus, a large amount pearlite was formed in a second phase, and a predetermined amount of martensite was not formed. Thus, the steel sheet No. 37 had TS of less than 440 MPa. A steel sheet No. 38 had a primary cooling rate of more than 15° C./sec., which was outside the scope of the present invention. This resulted in insufficient concentration of Mn, C, or another element in γ resulting from γ to α transformation during primary cooling and resulted in the formation of pearlite or bainite and an insufficient amount of martensite in the alloying treatment. Thus, the steel sheet No. 38 had TS of less than 440 MPa. A steel sheet No. 39 had a secondary cooling rate of less than 5° C./sec. This resulted in the formation of pearlite or bainite at a temperature in the range of approximately 400° C. to 500° C. and an insufficient amount of martensite. Thus, the steel sheet No. 39 had TS of less than 440 MPa. The average heating rate of a steel sheet No. 47 at temperatures in the range of 700° C. to 800° C. in the annealing process was above the scope of the present invention, resulting in insufficient growth of the {111} recrystallization texture of ferrite and an average r-value of less than 1.2.

In accordance with the present invention, a high-strength steel sheet having TS of 440 MPa or more, or even TS of 500 MPa or more or 590 MPa or more, an average r-value of 1.2 or more, λ≥80%, and excellent deep drawability and stretch flangeability can be inexpensively and stably manufactured by minimizing expensive Nb and actively using Ti. Thus, the present invention has significant industrial advantages. In automotive parts made of a high-strength steel sheet according to the present invention, portions that have been difficult to press can have a high strength. Thus, a high-strength steel sheet according to the present invention can contribute to improved crashworthiness and weight reduction of automotive bodies. Furthermore, a high-strength steel sheet according to the present invention can be applied to parts of electrical appliances and pipe materials, as well as automotive parts.

The invention claimed is:

1. A high-strength galvanized steel sheet comprising: on a mass percent basis, C: 0.010% or more and 0.06% or less, Si: more than 0.5% and 1.5% or less, Mn: 1.0% or more and 3.0% or less, P: 0.005% or more and 0.1% or less, S: 0.01% or less, sol.Al: 0.005% or more and 0.5% or less, N: 0.01% or less, Nb: 0.010% or more and 0.090% or less, and Ti: 0.015% or more and 0.15% or less, the Nb and C contents % by mass of the steel satisfying the relation of (Nb/93)/(C/12)<0.20, C* given by the following formula (1) satisfying 0.005≤C*≤0.025, and the remainder being Fe and incidental impurities without addition of V, wherein ferrite constitutes 70% by area ratio or more, martensite constitutes 3% by area ratio or more, the average r-value Lankford value is 1.2 or more, and the hole expansion ratio λ is 80% or more:

$$C^* = C - (12/93)Nb - (12/48)\{Ti - (48/14)N\} \quad (1)$$

wherein C, Nb, Ti, and N denote the C, Nb, Ti, and N contents % by mass of the steel, respectively, provided that if Ti−(48/14)N≤0, then Ti−(48/14)N=0.

2. The high-strength galvanized steel sheet according to claim 1, further comprising: on a mass percent basis, one or more of Mo and Cr constituting 0.5% or less of the steel sheet in total.

3. The high-strength galvanized steel sheet according to claim 1, further comprising: on a mass percent basis, one or two of Cu: 0.3% or less and Ni: 0.3% or less.

4. The high-strength galvanized steel sheet according to claim 1 further comprising: on a mass percent basis, one or two of Sn: 0.2% or less and Sb: 0.2% or less.

5. A high-strength galvanized steel sheet comprising: on a mass percent basis, C: 0.010% or more and 0.06% or less, Si: more than 0.5% and 1.5% or less, Mn: 1.0% or more and 3.0% or less, P: 0.005% or more and 0.1% or less, S: 0.01% or less, sol.Al: 0.005% or more and 0.5% or less, N: 0.01% or less, Nb: 0.010% or more and 0.090% or less, Ta: 0.005% or more and 0.1% or less, and Ti: 0.015% or more and 0.15% or less, the Nb and C contents % by mass of the steel satisfying the relation of (Nb/93)/(C/12)<0.20, wherein C* given by the following formula (2) satisfies the relation of 0.005≤C*≤0.025, and the remainder being Fe and incidental impurities without addition of V, wherein ferrite constitutes 70% by area ratio or more, martensite constitutes 3% by area ratio or more, the average r-value Lankford value is 1.2 or more, and the hole expansion ratio λ is 80% or more:

$$C^* = C - (12/93)Nb - (12/181)Ta - (12/48)\{Ti - (48/14)N\} \quad (2)$$

wherein C, Nb, Ta, Ti, and N denote the C, Nb, Ta, Ti, and N contents % by mass of the steel, respectively, provided that if Ti−(48/14)N≤0, then Ti−(48/14)N=0.

6. A method for manufacturing a high-strength galvanized steel sheet comprising: hot rolling and cold rolling a steel having the composition described in claim 1; heating the steel in the temperature range of 700° C. to 800° C. at an average heating rate of less than 3° C./sec.; annealing the steel at a temperature in the range of 800° C. to 950° C.; cooling the steel from the annealing temperature at an average cooling rate in the range of 3° C./sec. to 15° C./sec.; immersing the steel in a galvanizing bath for hot-dip galvanizing; and cooling the steel at an average cooling rate in the range of 5° C./sec. to 100° C./sec. after the hot-dip galvanizing, or performing alloying treatment of the galvanized steel after the hot-dip galvanizing and cooling the steel at an average cooling rate in the range of 5° C./sec. to 100° C./sec. after the alloying treatment.

7. The method for manufacturing a high-strength galvanized steel sheet according to claim 6, further comprising: starting cooling within three seconds after the hot rolling; cooling the steel to 650° C. at an average cooling rate of 40° C./sec. or more; coiling the steel at a coiling temperature in the range of 500° C. to 650° C.; and cold rolling the steel at a rolling reduction of 50% or more.

* * * * *